United States Patent [19]

Reiff et al.

[11] Patent Number: 5,607,482
[45] Date of Patent: Mar. 4, 1997

[54] CROSSLINKING AGENTS FOR TEXTILE PRINTING FIXING AGENTS

[75] Inventors: Helmut Reiff; Herbert Wigger, both of Leverkusen; Matthias Gehling, Leichlingen; Karl-Heinz Passon, Leverkusen, all of Germany

[73] Assignee: Bayer Aktiengesellschaft, Leverkusen, Germany

[21] Appl. No.: 525,109

[22] Filed: Sep. 8, 1995

[30] Foreign Application Priority Data

Sep. 20, 1994 [DE] Germany ............... 44 33 437.0

[51] Int. Cl.$^6$ ...................................... D06P 1/54
[52] U.S. Cl. ............... 8/495; 8/115.67; 8/192; 8/493; 8/541; 8/637.1; 427/288
[58] Field of Search .............. 8/493, 541, 495, 8/552, 637.1, 192, 193, 115.67; 106/499; 427/288

[56] References Cited

U.S. PATENT DOCUMENTS

| | | | |
|---|---|---|---|
| 3,684,758 | 8/1972 | Honig et al. | 260/29.6 NR |
| 3,684,759 | 8/1972 | Reiff et al. | 260/29.6 NR |
| 3,705,164 | 12/1972 | Honig et al. | 260/29.6 NR |
| 3,748,329 | 7/1973 | Liebsch et al. | 260/244 R |
| 4,421,826 | 12/1983 | Ohlson et al. | 428/394 |
| 4,780,101 | 10/1988 | Watanabe et al. | 8/192 |
| 4,837,359 | 6/1989 | Woynar et al. | 560/335 |
| 4,849,262 | 7/1989 | Uhl et al. | 427/288 |
| 4,960,848 | 10/1990 | Scholl et al. | 528/48 |
| 4,994,541 | 2/1991 | Dell et al. | 528/51 |
| 5,076,958 | 12/1991 | Pedain et al. | 252/182.2 |

FOREIGN PATENT DOCUMENTS

| | | |
|---|---|---|
| 2035513 | 8/1991 | Canada . |
| 2135385 | 12/1993 | Canada . |
| 571867 | 12/1993 | European Pat. Off. . |
| 3109978 | 1/1982 | Germany . |
| 4217716 | 12/1993 | Germany . |

OTHER PUBLICATIONS

Ullmanns Encyklopädie der technischen Chemie (Ullmann's Encyclopedia of Industrial Chemistry) 4th Ed., vol. 16, Verlag Chemie (Weinheim–N.Y., 1978), (month unavailable) pp. 159 et seq.

W. Berlenbach in Ullmanns Encyckloplädie der technischen Chemie [Ullmann's Encyclopedia of Industrial Chemistry] Fourth Edition vol. 22, p. 629, Verlag Chemie Weinheim 1982, also see 565 et seq, Textile printing.

*Primary Examiner*—Margaret Einsmann
*Attorney, Agent, or Firm*—Joseph C. Gil; Richard E. L. Henderson

[57] ABSTRACT

The present invention relates to a method for textile printing with aqueous dispersions in which an organic fixing agent is crosslinked with a blocked polyisocyanate having (i) an average molecular weight of about 800 to about 25,000, (ii) a content of blocked isocyanate groups, calculated as free NCO and based on non-blocked polyisocyanate, corresponding to an NCO content of about 5 to about 20% by weight, (iii) an ionic group content of about 1 to about 75 milliequivalents per 100 g of blocked polyisocyanate, and (iv) a content of polyalkylene oxide units of about 1 to about 20% by weight, based on blocked polyisocyanate, said blocked polyisocyanate being obtained by the reaction of (a) organic polyisocyanates,
(b) isocyanate-reactive compounds containing (potential) ionic groups,
(c) polyalkylene ether alcohols,
(d) NCO blocking agents, and
(e) optionally, isocyanate-reactive compounds that are different from components (b), (c), and (d).

9 Claims, No Drawings

CROSSLINKING AGENTS FOR TEXTILE PRINTING FIXING AGENTS

BACKGROUND OF THE INVENTION

The present invention relates to the use of certain blocked polyisocyanates as crosslinking agents for organic fixing agents used in textile printing.

In the textile printing industry the use of externally crosslinkable film-forming fixing agents, for example, those based on polyacrylate- or butadiene-acrylonitrile copolymers, is widespread. The mixtures of fixing agent and pigment usually also contain reactive compounds, which crosslink the fixing agent at a higher temperature after the printing operation and are thereby able to fix the print. (As used herein, the term "pigments" also encompasses dyes.) It is only this fixing process that results in the desired color fastness in water, which is important, for example, when the printed textiles are washed.

In practice, melamine/formaldehyde condensation products, which participate in crosslinking reactions only at temperatures above about 120° C., are still always used as the crosslinking agents for the fixing agents employed in textile printing pastes. According to W. Berlenbach in *Ullmanns Encyklopädie der technischen Chemie* [*Ullmann's Encyclopedia of Industrial Chemistry*], Fourth Edition, Volume 22 (Verlag Chemie, Weinheim, 1982), page 629, crosslinking via N-methylol groups of the fixing agent is catalyzed by acid; the best fixing results are obtained using dry hot air over a period of 5 to 10 minutes at 140° C. or 30 to 60 seconds at 175° C., for example.

Textile printing pastes proposed in German Offenlegungsschrift 3,529,530 contain externally crosslinkable fixing agents and deactivated (that is, partially blocked) polyisocyanates as crosslinking agents dispersed in water or in organic solvents. According to the claims of this patent, these fixing agents comprise solid polyisocyanates having melting points above 470° C. For example, dimeric toluene diisocyanate having a melting point of 170° C. is used.

German Offenlegungsschrift 3,109,978 describes aqueous textile printing pastes that contain film-forming, externally crosslinkable polymers as fixing agents and NCO prepolymers as crosslinking agents. Compared with low molecular weight polyisocyanates, these prepolymers apparently impart a prolonged pot life to the printing pastes because of their higher molecular weights and their reduced content of reactive groups. However, this is insufficient under practical conditions; in particular, the finished printing pastes are not stable on storage.

It has also been proposed that polyisocyanate mixtures comprising hydrophilic polyisocyanates or hydrophilic isocyanate derivatives containing carbodiimide groups be used as crosslinking agents for fixing agents employed in textile printing. See German Offenlegungsschrift 4,217,716. However, the storage stability of printing pastes based on aqueous dispersions is also unsatisfactory, because a continuous loss of isocyanate groups takes place through reaction of free isocyanate groups with water, which ultimately leads to products which are inactive with respect to crosslinking.

The prior art textile printing pastes described above are subject to various disadvantages. For example, formaldehyde is given off during the crosslinking reaction or even later when the printed textiles are used, which is particularly undesirable, or the number of reactive groups available for crosslinking is difficult to control, or the crosslinking agent is difficult to disperse.

The object of the present invention, particularly for environmental and health reasons, was to prepare formaldehyde-free crosslinking agents for printing pastes that are; stable on storage and can be processed to form textile prints of high color fastness. In this respect, the term "formaldehyde-free" refers to the absence of disadvantage related to the emission of formaldehyde over the course of time, which is an undesirable property of products containing methylol groups. In the sense of the invention, the term "stable on storage" not only means that the dispersions should not segregate but, most importantly, also means that the crosslinking agents do not lose their reactivity during storage and thus after storage give prints having an undiminished, pronounced color fastness.

It has now surprisingly been found that the object of the invention can be achieved by using certain blocked polyisocyanates. Thus, printing pastes having storage stabilities exceeding four weeks and prints having high levels of dry- and wet-rubbed color fastness (more than 100 brush washings) become accessible.

SUMMARY OF THE INVENTION

The present invention relates to a method for textile printing with an organic fixing agent comprising applying to a textile substrate an aqueous dispersion comprising (1) an organic fixing agent;
(2) about 1 to about 25 parts by weight per 100 parts of the organic fixing agent of a crosslinking agent comprising a blocked polyisocyanate having (i) an average molecular weight of about 800 to about 25,000 (preferably 1000 to 10,000), (ii) a content of blocked isocyanate groups, calculated as free NCO and based on non-blocked polyisocyanate (i.e., polyisocyanate before blocking), corresponding to an NCO content of about 5 to about 20% by weight (preferably 10 to 20% by weight), (iii) an ionic group content of about 1 to about 75 (preferably 2 to 25) milliequivalents (meq) per 100 g of blocked polyisocyanate, and (iv) a content of polyalkylene oxide units of about 1 to about 20% by weight (preferably 1 to 10% by weight), based on blocked polyisocyanate, said blocked polyisocyanate being obtained by the reaction of
   (a) organic polyisocyanates,
   (b) isocyanate-reactive compounds containing (potential) ionic groups,
   (c) polyalkylene ether alcohols,
   (d) NCO blocking agents, and
   (e) optionally, isocyanate-reactive compounds that are different from components (b), (c), and (d);
(3) a pigment;
(4) optionally, auxiliary processing agents; and
(5) water.

DETAILED DESCRIPTION OF THE INVENTION

Due to their hydrophilic nature, blocked polyisocyanates containing incorporated polyalkylene oxide units and/or ionic groups are dispersible in water and can therefore be processed from an aqueous phase. They are heat-curable, because when the back-cleavage temperature at which the blocking agent splits off is reached, free isocyanate groups are formed and are then capable of reacting with compounds that react with isocyanates (namely compounds containing Zerewittinoff-active hydrogen atoms).

Preparation of these polyisocyanate mixtures can be effected in the manner known in the art by the reaction of a polyisocyanate component (a) having an (average) NCO functionality of 2.1 to 4.4 (preferably 2.3 to 4.3) and comprising at least one polyisocyanate containing exclusively (cyclo)aliphatically-bound isocyanate groups with a monohydric or polyhydric polyalkylene oxide polyether alcohol (c) having a statistical average of 5 to 70 ethylene oxide units and/or with isocyanate-reactive compounds (b) that contain (potential) ionic groups, preferably while maintaining an NCO/OH equivalent ratio of about 4:1 to about 100:1, wherein, in addition, the type and amount of the starting components are selected so that the resulting reaction products correspond to the conditions mentioned above.

Polyisocyanate component (a) comprises any polyisocyanates that have a uretdione and/or isocyanurate, urethane and/or allophanate, biuret or oxadiazine structure are prepared by the modification of simple (cyclo)aliphatic diisocyanates, as described, for example, in German Offenlegungsschriften 1,670,666, 3,700,209 and 3,900,053, or European Patent Applications 336,205, and 339,396. Polyisocyanate components (a) containing less than 1% by weight (preferably less than 0.5% by weight) of monomeric isocyanate are particularly preferred.

Diisocyanates that are suitable for the preparation of such polyisocyanates are essentially those having a molecular weight in the range about 140 to about 400 and containing (cyclo)aliphatically bonded isocyanate groups, such as, for example, 1,4-diisocyanatobutane, 1,6-diisocyanatohexane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanatomethylcyclohexane (isophorone diisocyanate) and 4,4'-diisocyanatodicyclohexylmethane, or any mixtures of such diisocyanates.

The preferred polyisocyanates (a) are commercially available products based on biureted hexamethylene diisocyanate.

In addition, polyisocyanate component (a) preferably comprises polyisocyanate mixtures that have an NCO content of 19 to 24% by weight and contain isocyanurate groups consisting substantially of trimeric 1,6-diisocyanatohexane and, optionally, of dimeric 1,6-diisocyanatohexane, and, optionally, uretdione groups. The corresponding polyisocyanates having the specified NCO content that contain isocyanurate groups and that are substantially free from biuret groups are most preferably used as component (a). Such polyisocyanates can be obtained by the catalytic trimerization of 1,6-diisocyanatohexane, with the formation of isocyanurate, a process known in the art, and preferably have an (average) NCO functionality of 3.2 to 4.2. Such products are also commercially available.

In general, compounds that can be used as synthesis components (b) for the incorporation of ionic groups are those that, in addition to having at least one group which reacts with NCO, also contain at least one cationic or anionic group incorporated in the molecule (such as an ammonium, phosphonium, sulfonium, carboxylate, sulfonate, phosphate, phosphonate, or phosphinate group). Compounds that are suitable as synthesis components (b) for the incorporation of potentially ionic groups are those that, in addition to having at least one group which reacts with NCO, also contain at least one group that is capable of forming an ionic group. Examples of such potentially ionic groups are amino, phosphano, thio, carboxyl, sulfo, phosphonic acid, phosphoric acid, and phosphinic acid groups.

Preferred isocyanate-reactive compounds (b) are, therefore, primarily

1. Compounds containing basic tertiary amino groups that can be quaternized or that can be neutralized with aqueous acids:
   (a) monohydric alcohols, particularly alkoxylated aliphatic, cycloaliphatic, aromatic, and heterocyclic secondary amines, such as N,N-dimethylethanolamine, N,N-diethylethanolamine and N,N-dibutylethanolamine, as well as 1-dimethylamino-2-propanol, N-methyl-N-β-hydroxyethylaniline, N-methyl-N-β-hydroxypropylaniline, N-ethyl-N-β-hydroxyethylaniline, N-butyl-N-β-hydroxyethylaniline, N-oxyethylpiperidine, N-oxethylmorpholine, α-hydroxyamylpyridine, and γ-hydroxyethylquinoline,
   (b) diols and triols, particularly alkoxylated aliphatic, cycloaliphatic, aromatic, and heterocyclic primary amines, such as N-methyldiethanolamine, N-butyldiethanolamine, N-oleyldiethanolamine, N-cyclohexyldiethanolamine, N-methyldiisopropanolamine, N-cyclohexyldiethanolamine, N-methyldiisopropanolamine, N-cyclohexyldiethanolamine, N,N-dioxyethylaniline, N,N-dioxyethyl-m-toluidine, N,N-dioxyethyl-p-toluidine, N,N-dioxypropylnaphthylamine, dioxyethylpiperazine, polyethoxylated butyldiethanolamine, polypropoxylated methyldiethanolamine (wherein the polyalkoxylated products have an average molecular weight of 250 to 3000), tris[2-hydroxypropyl]amine, N,N'-dimethyl-N,N'-bis(oxyethyl)hydrazine, and N,N'-dimethyl-N,N'-bis(oxypropyl)ethylenediamine,
   (c) amino alcohols, obtained, for example, by the hydrogenation of addition products of alkylene oxide and acrylonitrile to primary amines, such as N-methyl-N-(3-aminopropyl)ethanolamine, N-cyclohexyl-N-(3-aminopropyl)-2-propanolamine, N,N-bis(3-aminopropyl)-ethanolamine, and N-(3-aminopropyl)diethanolamine,
   (d) amines, such as N,N-dimethylethylenediamine, 1-diethylamino-4-aminopentane, α-aminopyridine, 3-amino-N-ethylcarbazole, N,N-dimethylpropylenediamine, N-aminopropylpiperidine, N-aminopropylmorpholine, N-aminopropylethylene imine, and 1,3-bispiperidino-2-aminopropane,
   (e) diamines or triamines, particularly those obtained by the hydrogenation of addition products of acrylonitrile to primary and secondary amines, such as bis(3-aminopropyl)methylamine, bis(3-aminopropyl)cyclohexylamine, bis(3-aminopropyl)aniline, bis(3-aminopropyl)toluidine, diaminocarbazole, bis(aminopropoxyethyl)butylamine and tris(aminopropyl)amine;

2. Compounds containing carboxyl or hydroxyl groups capable of forming salts:
   (a) hydroxy- and mercapto-carboxylic acids, such as glycolic acid, thioglycolic acid, lactic acid, trichlorolactic acid, dimethylolpropionic acid, malic acid, dioxymaleic acid, dioxyfumaric acid, tartaric acid, dioxytartaric acid, mucic acid, saccharic acid, citric acid, salicylic acid, 2,6-dioxybenzoic acid, protocatechuic acid, α-resorcylic acid, β-resorcylic acid, hydroquinone-2,5-dicarboxylic acid, 4-hydroxyisophthalic acid, 4,6-dihydroxyisophthalic acid, oxyterephthalic acid, 5,6,7,8-tetrahydronaphthol-(2)-carboxylic acid-(3), 1-hydroxy-2-naphthoic acid, 2,8-dihydroxy-3-naphthoic acid, β-oxypropionic acid, and m-oxybenzoic acid, (b) polycarboxylic acids, such as sulfonodiacetic acid, nitrilotriacetic acid, ethylenediaminetetraacetic acid, diglycolic acid, thiodiglycolic acid, methylene-bis-thioglycolic acid, malonic acid, oxalic acid, succinic acid, glutaric acid, adipic acid, maleic acid, fumaric acid, gallic acid, phthalic acid, tetrachlorophthalic acid, isophthalic acid, terephthalic acid, 1,4,5,8-naphthalenetetracarboxylic acid, o-tolyl iminodiacetic acid, β-naphthyliminodiacetic acid, pyridinedicarboxylic acid, and dithiodipropionic acid, (c) aminocarboxylic acids, such as oxaluric acid, anilinoacetic acid, 2-hydroxycarbazole-3-carboxylic acid, glycine, sarcosine, methionine, α-alanine, β-alanine, 6-aminocaproic acid, 6-benzylamino-2-chlorocaproic acid, 4-aminobutyric acid, aspartic acid, glutamic acid, histidine, anthranilic acid, 2-ethylaminobenzoic acid, N-(2-carboxyphenyl)aminoacetic acid, 2-(3'-aminobenzenesulfonylamino)benzoic acid, 3-aminobenzoic acid, 4-aminobenzoic acid, N-phenylaminoacetic acid, 3,4-diaminobenzoic acid, 5-aminobenzene-dicarboxylic acid, and 5-(4'-aminobenzoylamino)-2-aminobenzoic acid, (d) hydroxy- and carboxy-sulfonic acids, such as 2-hydroxy-ethanesulfonic acid, phenol-2-sulfonic acid, phenol-3-sulfonic acid, phenol-4-sulfonic acid, phenol-2,4-disulfonic acid, sulfoacetic acid, m-sulfobenzoic acid, p-sulfobenzoic acid, benzoic acid-(1)-disulfonic acid-(3,5), 2-chlorobenzoic acid-(1)-sulfonic acid-(4), 2-hydroxybenzoic acid-(1)-sulfonic acid-(5), naphthol-(1)-sulfonic acid, naphthol-(1)-disulfonic acid, 8-chloronaphthol-(1)-disulfonic acid, naphthol-(1)-trisulfonic acid, naphthol-(2)-sulfonic acid-(1), naphthol-(2)-trisulfonic acid, 1,7-dihydroxynapthalene-3-sulfonic acid, 1,8-dihydroxynaphthalene-2,4-disulfonic acid, chromotropic acid, 2-hydroxynaphthoic acid-(3)-sulfonic acid-(6) and 2-hydroxy-carbazolesulfonic acid-(7), and (e) aminosulfonic acids, such as aminosulfonic acid, hydroxylaminomonosulfonic acid, hydrazine disulfonic acid, sulfanilic acid, N-phenylaminomethanesulfonic acid, 4,6-dichloroaniline-2-sulfonic acid, phenylenediamine-(1,3)-disulfonic acid-(4,6), N-acetylnaphthylamine-(1)-sulfonic acid-(3), naphthylamine-(1)-sulfonic acid, naphthylamine-(2)-sulfonic acid, naphthylaminedisulfonic acid, naphthylaminetrisulfonic acid, 4,4'-di(p-aminobenzoylamino)diphenylurea-3,3'-disulfonic acid, phenylhydrazine-2,5-disulfonic acid, 2,3-dimethyl-4-aminoazobenzenedisulfonic acid-(4',5), 4'-aminostilbene-2,2'-disulfonic acid-[4-azo-4]anisole, carbazole-2,7-disulfonic acid, taurine, methyl taurine, butyl taurine, 3-aminobenzoic acid-(1)-sulfonic acid-(5), 3-aminotoluene-N-methanesulfonic acid, 6-nitro-1,3-dimethylbenzene-4-sulfaminic acid, 4,6-diaminobenzene-1,3-disulfonic acid, 2,4-diaminotoluene-5-sulfonic acid, 4,4'-diaminodiphenyl-2,2'-disulfonic acid, 2-aminophenolsulfonic acid-(4), 4,4'-diaminodiphenylethersulfonic acid-(2), 2-aminoanisole-N-methanesulfonic acid, and 2-amino-diphenylaminosulfonic acid.

Suitable salt-forming agents for isocyanate-reactive compounds of Group 1 comprise inorganic and organic acids and compounds containing reactive halogen atoms and the corresponding esters of strong acids. Examples include hydrochloric acid, nitric acid, hypophosphorous acid, amidosulfonic acid, hydroxylamine monosulfonic acid, formic acid, acetic acid, glycolic acid, lactic acid, chloroacetic acid, bromoacetic acid ethyl ester, methyl chloride, butyl bromide, dimethyl sulfate, diethyl sulfate, benzyl chloride, p-toluenesulfonic acid methyl ester, methyl bromide, ethylene chlorohydrin, ethylene bromohydrin, glycerin-α-bromohydrin, chloroacetic ester, chloroacetamide, bromoacetamide, dibromoethane, chlorobromobutane, and dibromobutane.

Suitable salt-forming agents for isocyanate-reactive compounds of Group 2 comprise inorganic and organic bases, such as sodium hydroxide, potassium hydroxide, potassium carbonate, sodium hydrogen carbonate, ammonia, and primary, secondary, and tertiary amines.

Finally, organic phosphorus compounds may also be used as compounds capable of salt formation. Such compounds include basic phosphines that are capable of insertion, such as diethyl-β-hydroxyethylphosphine, methyl-β-hydroxyethylphosphine, and tris(β-hydroxymethyl)phosphine, and bis(α-hydroxyisopropyl)phosphinic acid, hydroxyalkanephosphonic acid, and phosphoric acid-bis-glycol ester.

The reactants may be allowed to react with or without solvent.

Preferred components (b) are, therefore, polyhydroxycarboxylic and sulfonic acids, polyamino-carboxylic and -sulfonic acids, and the salts of these compounds (preferably the alkali and ammonium salts, particularly the sodium and potassium salts).

Among components (b), the class comprising sulfonate diols is particularly preferred. Suitable compounds of this class are described, for example, in German Offenlegungsschrift 2,446,440. In general, such compounds correspond to the formula (I)

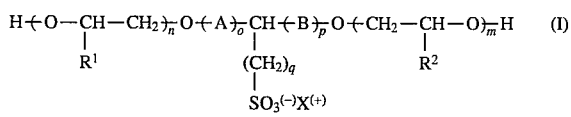

wherein

A and B represent identical or different divalent aliphatic hydrocarbon groups having 1 to 6 carbon atoms, $R^1$ and $R^2$ independently represent hydrogen, an aliphatic hydrocarbon group having 1 to 4 carbon atoms, or a phenyl group, $X^+$ represents an alkali metal ion, or an ammonium group that is optionally substituted, n and m independently of each other represent zero or numbers from 1 to about 30, o and p each represent zero or 1, and q represents zero, 1, or 2.

Component (c) comprises monohydric or polyhydric polyalkylene oxide polyether alcohols containing a statistical average of about 5 to about 70 (preferably 6 to 60) ethylene oxide units per molecule that can be obtained in the known manner by the alkoxylation of suitable starter molecules.

Any monohydric or polyhydric alcohols having a molecular weight in the range 32 to 150, such as those that are also used according to European Patent Application 206,059, for example, can be used as starter molecules for the preparation of polyether alcohols (c). Monofunctional aliphatic alcohols having 1 to 4 carbon atoms are preferably used as starter molecules. Methanol, ethanol, propanol, and butanol is particularly preferred starter alcohols.

Preferred polyether alcohols (c) for the preparation of the polyisocyanate mixtures according to the invention are monofunctional polyalkylene oxide polyethers that are started on an aliphatic alcohol containing 1 to 8 carbon atoms and that have a statistical average of about 6 to about 60 ethylene oxide units. Particularly preferred polyether alcohols (c) are pure polyethylene glycol monomethyl alcohols that have a statistical average of 7 to 20 ethylene oxide units.

The blocked polyisocyanates according to the invention preferably have a content of incorporated polyalkylene ether groups, calculated as recurring —O—alkylene- alkyleneoxy groups, of about 3 to about 25% by weight based on blocked polyisocyanate.

The preferred polyalkylene ether groups contain about 50 to 100% by weight of ethylene oxide units, the balance of the polyalkylene oxide groups preferably being exclusively propylene oxide units. Accordingly, ethylene oxide polyethers and ethylene/propylene mixed polyethers having a predominant weight fraction of ethylene oxide units are therefore preferred. Pure ethylene oxide polyethers are especially preferred. The incorporated polyethylene oxide blocks may have an average molecular weight of about 300 to about 6000 (preferably 500 to 3000).

Suitable isocyanate-reactive compounds (e) for the preparation of the blocked polyisocyanates according to the invention comprise compounds that react with NCO but are different from components (b) and (c), that contain 2 to 8 (preferably 2 or 3) hydroxyl groups per molecule, and that have an (average) molecular weight of up to about 10,000 (preferably up to 6000). In this respect, both low molecular weight polyhydroxyl compounds having molecular weights of 62 to 499 and higher molecular weight polyhydroxyl compounds having average molecular weights of at least 500 (preferably at least 1000) are suitable.

Low molecular weight polyhydroxyl compounds ("chain extenders") comprise very different types of diols, such as the following:

(i) alkanediols such as ethylene glycol, 1,3-propylene glycol and 1,4-propylene glycol, 1,4-butanediol, 1,5-pentanediol, 1,3-dimethylpropanediol, and 1,6-hexanediol;

(ii) ether diols, which in the case of polyalkylene ether diols contain not more than 4 recurring alkyleneoxy groups, such as diethylene glycol, triethylene glycol, or 1,4-phenylene-bis(β-hydroxyethyl ether);

(iii) ester diols corresponding to the formulas

HO—($C_2$-$C_6$ alkylene)—CO—O—($C_2$-$C_6$ alkylene)—OH
and
HO—($C_2$-$C_6$ alkylene)—O—CO—R—O—($C_2$-$C_6$ alkylene)—OH wherein R represents an alkylene or arylene group having 1 to 10 (preferably 2 to 6) carbon atoms, such as δ-hydroxybutyl ε-hydroxycaproic acid ester, ω-hydroxyhexyl γ-hydroxybutyric acid ester, adipic acid β-hydroxyethyl ester, terephthalic acid bis(β-hydroxyethyl) ester, and α-methyl-α-hydroxymethylpropionic acid neopentyl glycol monoester ("ester diol 204").

Polyamines, preferably aliphatic or aromatic diamines, may also be used as chain extenders. Examples include ethylenediamine, 1,2- and 1,3- propylenediamine, 1,4-tetramethylenediamine, 1,6-hexamethylenediamine, N,N'-diisobutyl-1,6-hexamethylenediamine, 1,11-undecamethylene diamine, cyclohexane-1,3- and -1,4-diamine and mixtures thereof, 1-amino-3,3,5-trimethyl-5-aminomethylcyclohexane, 2,4- and 2,6-hexahydrotoluenediamine and mixtures thereof, perhydro-2,4'- and -4,4'-diaminodiphenylmethane and their 3,3'-dimethyl derivatives, bis-(3-aminopropyl)methylamine; p-xylylene diamine, bis-anthranilic acid esters according to German Offenlegungsschriften 2,040,644 and 2,160,590, 3,5- and 2,4-diaminobenzoic acid esters according to German Offenlegungsschrift 2,025,900, the diamines containing ester groups described in German Offenlegungsschriften 1,803,635, 2,040,650, and 2,160,589, 3,3'-dichloro-4,4'-diaminodiphenylmethane, toluene diamine, 4,4'-diaminodiphenylmethane, and 4,4'-diaminodiphenyl disulfide.

Hydrazine, hydrazine hydrate and substituted hydrazines are also to be considered as diamines in this sense. Examples include methyl hydrazine, N,N'-dimethyl hydrazine and their homologs, as well as acid dihydrazides, such as carbodihydrazide and oxalic acid dihydrazide, the dihydrazides of malonic acid, succinic acid, glutaric acid, adipic acid, β-methyladipic acid, sebacic acid, hydracrylic acid, and terephthalic acid, semicarbazidoalkylene hydrazides, such as 2-semicarbazidopropionic acid hydrazide (German Offenlegungsschrift 1,770,591), semicarbazidoalkylene carbazine esters, such as 2-semicarbazidoethylcarbazine esters (German Offenlegungsschrift 1,918,504), or aminosemicarbazide compounds such as β-aminoethyl semicarbazidocarbonate (German Offenlegungsschrift 1,902,931).

Examples of possible components (e) for the preparation of the blocked polyisocyanates according to the invention also include tri- and tetrahydric alcohols such as glycerin, trimethylolethane, trimethylolpropane, trimethylolhexane, and pentaerythritol.

Further examples of compounds (e) include polyesters, polycarbonates, and polyacetals having terminal OH, SH and/or NH groups and which are customary in polyurethane chemistry, such as simple polyester diols having an average molecular weight less than 2000 that may be prepared, for example, by the reaction of adipic acid or phthalic acid with excess amounts of alkanediols such as ethylene glycol, tetramethylene glycol, or hexamethylene glycol.

It has been found advantageous to select the starting components for the preparation of the blocked polyisocyanates according to the invention so that branched products are formed. Products that are advantageous for the purposes of the present invention are formed if the total functionality of the polyisocyanates according to the invention is greater than 2.0 (preferably greater than 2.5, most preferably 2.8 to 4.0). In the sense of the present invention, the term "total functionality" means the average number of (blocked) polyisocyanate groups per molecule. For example, polyisocyanates that contain an average number of isocyanate groups per molecule of more than 2.0 (preferably more than 2.5, most preferably 2.8 to 4.0) can be used, provided that compounds having two isocyanate-reactive groups per molecule are used as reactants. Because the manner in which branching locations occur is, of course, insignificant for the purposes of the invention, isocyanates having three or more isocyanate groups, such as the triisocyanates listed above under (a), including the trimers, biurets, allophanates, and urethanes that are accessible from diisocyanates, can be replaced by the equivalent amount of polyfunctional isocyanate-reactive compounds, such as, for example, triols. One skilled in the art can readily select the conditions so that gelling is reliably prevented.

Non-blocked intermediates that can be used for the preparation of the blocked polyisocyanates according to the invention can be prepared by reaction of polyisocyanates (a) with components (b) and (c) and optional component (e) either simultaneously or in succession in any desired sequence. Preferred reaction temperatures are about 50° to about 120° C.; the reaction is generally complete within one to three hours.

In particular, suitable blocking agents (d) comprise compounds that preferably have one group capable of reacting with isocyanate groups and which enters into an addition reaction with organic isocyanates above 50° C. (preferably between 60° and 100° C.). Examples of suitable blocking agents of this type include secondary or tertiary alcohols, such as isopropyl alcohol or tert-butyl alcohol; acidic C—H compounds (that is, active methylene compounds), such as malonic acid dialkyl esters, acetylacetone, or acetoacetic acid alkyl esters; oximes, such as formaldoxime, acetaldoxime, methyl ethyl ketone oxime, cyclohexanone oxime, acetophenone oxime, benzophenone oxime, or diethylglyoxime; lactams, such as ε-caprolactam, δ-valerolactam, or γ-butyrolactam; phenols, such as phenol or o-methylphenol; N-alkylamides, such as N-methylacetamide; imides, such as phthalimide; imidazole; and triazole. Preferred compounds for use as blocking agents according to the invention include methyl ethyl ketoxime, ε-caprolactam, and acidic C—H compounds such as malonic acid $C_1$–$C_4$ alkyl esters (particularly malonic acid diethyl ester), acetoacetic acid $C_1$–$C_4$ alkyl esters (particularly acetoacetic acid ethyl ester), or acetylacetone. Aliphatic ketoximes having 2 to 10 carbon atoms, such as methyl ethyl ketoxime, are quite particularly preferred for use as blocking agents.

For the preparation of the blocked polyisocyanates according to the invention, the non-blocked polyisocyanates of the first reaction step(s) are preferably allowed to react with an amount of blocking agent that corresponds to an equivalent ratio of NCO groups to isocyanate-reactive groups (of the blocking agent) of about 1:0.95 to about 1:1.15 (preferably 1:1 to 1:1.1). Such equivalent ratios, therefore, also include the possibility of causing the reaction to occur with less than an equivalent amount of blocking agent and of subjecting the remaining NCO groups either to attack by water or to reaction with chain extenders (preferably amine chain extenders). When using blocking agents containing active methylene groups, it is advantageous to use basic catalysts such as diazabicyclooctane, triethylamine, alkali alcoholates (for example, sodium ethylate) or alkali phenolates (for example, sodium phenolate). When using blocking agents containing OH or NH groups, catalysis of the blocking reaction with a metal salt, such as dibutyltin dilaurate or tin octoate, may be advantageous.

The final reaction step for the preparation of the blocked polyisocyanates according to the invention is carried out very simply: the reaction can be carried out within the scope of the ranges of time and temperature mentioned above until all the NCO groups have been consumed.

Although it is particularly advantageous to dispense with organic solvents completely, organic solvents may, of course, also be used in the preparation of the blocked polyisocyanates to be used according to the invention. Organic solvents can be routinely used when viscoelastic or solid blocked polyisocyanates are used according to the invention.

Preferred organic solvents comprise, inter alia, ketones, such as acetone, methyl ethyl ketone, and cyclohexanone; ethers, such as diethyl and dibutyl ethers, tetrahydrofuran, and dioxane; ethers and/or esters of ethylene glycol and propylene glycol, such as ethylene glycol monomethyl and monoethyl ethers, and ethylene glycol monomethyl and monoethyl ether acetates; $C_2$–$C_4$ carboxylic acid $C_1$–$C_6$ alkyl esters, such as ethyl and butyl acetates; amides, such as N,N-dimethylformamide, N,N-dimethylacetamide, and N-methylpyrrolidone; sulfolane; N-methyl-caprolactam; propylene glycol diacetate; petroleum spirit; and aromatic compounds, such as benzene, toluene, and xylenes. It is not recommended to use organic solvents that contain isocyanate-reactive groups, such as methanol, ethanol, n-propanol, or isopropyl alcohol, when preparing the blocked polyisocyanates to be used according to the invention. If desired, the organic solvents may be again removed from the blocked polyisocyanates to be used according to the invention, for example, by distillation.

The blocked polyisocyanates to be used according to the invention are outstandingly suitable for conversion into stable aqueous dispersions and are preferably used in this form. The content of blocked polyisocyanates to be used according to the invention in such aqueous dispersions may vary within wide limits but generally amounts to about 20 to 80% by weight (preferably 25 to 50% by weight). Dispersion of the blocked polyisocyanates to be used according to the invention may be brought about simply by adding water with stirring, but may, of course, also be effected in the reverse manner by the addition of the blocked polyisocyanate to water. The addition is preferably effected with stirring. The dispersion operation may be brought about in the presence or absence of organic solvents, which are preferably miscible with water. Suitable organic solvents comprise the solvents mentioned above, as well as those compounds that can act as solvents and contain isocyanate-reactive groups, for example, alcohols such as methanol, ethanol, n-propanol, or isopropyl alcohol.

The use of organic solvents, preferably organic solvents that are miscible with water, is particularly preferred when the aqueous dispersion is to contain more than about 50% by weight of the blocked polyisocyanate to be used according to the invention. Thus, for example, after the final reaction step the blocked polyisocyanate to be used according to the invention can be dissolved in a water-dilutable organic solvent such as isopropyl alcohol, up to a content of blocked polyisocyanate to be used according to the invention of about 80 to about 95% by weight, based on the sum of the organic solvent and the blocked polyisocyanate to be used according to the invention. The organic solution obtained can then be further diluted with water.

The use of organic solvents during dispersion may also be dispensed with completely, because the blocked polyisocyanates to be used according to the invention generally spontaneously form dispersions with water.

In general, the temperature during dispersion may be about 20° to about 100° C. (preferably 30° to 80° C.). The aqueous dispersions thus obtained generally contain the blocked polyisocyanates to be used according to the invention as particles having an average diameter $d_{50}$ of about 50 to about 800 mμ (preferably 100 to 300 mμ).

The molecular weights $M_w$, determined as the weight average, are between about 800 and about 25,000. Molecular weights $M_w$ can be determined, for example, by gel chromatography (using polystyrene as the standard). Details for such determinations are described in handbooks of polymer analysis.

The average particle diameters $d_{50}$ is the diameter above and below which 50% of the particles lie in each case. Particle diameters $d_{50}$ can be determined by using ultracentrifuge measurements (W. Scholtan and H. Lange, *Kolloid. Z. und Z. Polymere,* 250 (1972), 782–796) or by using electron microscopy and subsequent particle counting (G. K ämpf and H. Schuster, *Angew. Makromolekular Chemie,* 14 (1970), 111–129).

Aqueous dispersions that contain the blocked polyisocyanates to be used according to the invention as the dispersed phase generally have a storage stability in excess of one year at room temperature and a storage stability of more than 12 weeks at 50° C.

Examples of suitable fixing agents that can be crosslinked by means of the polyisocyanates to be used according to the invention include polymers such as those based on natural or synthetic rubber, styrene/butadiene copolymers, polymers of 2-chlorobutadiene, styrene/acrylonitrile copolymers, polyethylene, chloro-sulfonated or chlorinated polyethylene, butadiene/acrylonitrile copolymers, butadiene/methacrylate copolymers, polyacrylic acid esters, PVC, or optionally partially saponified ethylene/vinyl acetate copolymers or compounds formed by addition polymerization, such as those based on polyurethane, namely the products described, for example, in *Ullmanns Encyklopädie der technischen Chemie* [*Ullmann's Encyclopedia of Industrial Chemistry*], Fourth Edition, Volume 16, Verlag Chemie (Weinheim-New York, 1978), pages 159 et seq., as well as the literature references cited therein, German Offenlegungsschriften 1,953,345, 1,953,348, or 1,953,349, or U.S. Pat. No. 2,939,013. Polyacrylate and polyurethane fixing agents are preferred.

In general, 1 to 25 (preferably 2.5 to 12.5) parts by weight of the crosslinking agent to be used according to the invention are employed per 100 parts by weight of fixing agent. This quantity range presupposes that the fixing agents contain a number of isocyanate-reactive groups (preferably hydroxyl groups) that is at least sufficient for the blocked isocyanate groups of the added crosslinking agent to be capable of reacting completely during, at the latest, the thermal fixing operation.

Because the crosslinking agents to be used according to the invention are capable of reacting with Zerewittinoff-active hydrogen atoms other than hydroxyl groups, it is not necessary for the polymers used for the fixing agents to contain hydroxyl groups. Carboxyl, urethane, urea, amine, amide groups, and the like are also accessible to a crosslinking reaction (see J. H. Saunders and K. C. Frisch, *Polyurethanes*, Part 1 (Interscience Publishers, New York 1962), pages 63 et seq.). During crosslinking it is generally unnecessary, and often not even desirable, to allow all the groups that are available for crosslinking to react. In general, the crosslinking effect is merely ascertained phenomenologically. The attainment of a given insensitivity to water, abrasion resistance, and other properties while not too severely impairing the elastic properties is generally reached with the above-mentioned 1 to 25 parts by weight of crosslinking agent per 100 parts by weight of fixing agent.

The fixing agents to be used for the printing pastes are preferably free from perfluoroalkyl groups.

Practically no restrictions exist for the pigments that are suitable for the textile printing pastes. Suitable pigments can be inorganic or organic. Examples of suitable organic pigments include those of the azo, anthraquinone, azoporphine, thioindigo, dioxazine, naphthalenetetracarboxylic acid, or perylenetetracarboxylic acid series, as well as laked dyes, such as dyes containing calcium, magnesium, or aluminum lacquers of sulfonic acid and/or carboxylic acid groups, a large number of which are known, for example, from the Colour Index, Second Edition. Examples of suitable inorganic pigments include zinc sulfides, titanium dioxides, ultramarines, iron oxides, nickel and chromium compounds, carbon blacks, silicas, and aluminas.

The amount of pigment, based on the sum of the fixing agent plus crosslinking agent plus pigment in the textile printing pastes is generally about 0.5 to about 50% by weight (preferably 5 to 35% by weight), based on the sum of fixing agent, crosslinking agent, and pigment.

The fixing agent and the crosslinking agent may be dispersed in water as usual, optionally with the use of organic solvents (for example, in the so-called "petroleum spirit emulsion process", in which oil-in-water emulsions are formed). For reasons of environmental compatibility, however, printing pastes that are free from petroleum spirit are preferred. Components having reactive groups that can interfere with the reaction between fixing agent and crosslinking agent are advantageously omitted during formulation.

Other auxiliary processing agents, such as emulsifiers, thickeners, evaporation inhibitors, catalysts, feel enhancers, or anti-foaming agents, may, of course, be used for the preparation of the printing pastes.

The usual printing technology methods are suitable for processing the textile printing pastes. See, for example, "Textile Printing" in *Ullmanns Encyclopädie der technischen Chemie*, Fourth Edition, Volume 22 (Verlag Chemie, Weinheim, 1982), pages 565 et seq.

The applied prints are crosslinked at elevated temperatures. The cross-linking agents to be used according to the invention permit temperatures above 100° C. to be used, although temperatures of about 120° to about 170° C. are preferred.

The cleavage temperature can be reduced by suitable catalysts, such as organic tin compounds.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Crosslinking Agent 1

634.7 g, (3.286 NCO equivalents) of the biuret of hexamethylene diisocyanate (DESMODUR® N-3200, Bayer AG) and 23.3 g (0.0105 mole) of an n-butanol-started monofunctional ethylene oxide/propylene oxide polyether having a molecular weight of 2150 and an ethylene oxide content of 80% were mixed together. The mixture was heated to 95° to 100° C. and stirred for 30 minutes at this temperature. After cooling to 60° C., the mixture was reacted at 60° to 70° C. with 242 g (2.7817 mole) of butanone oxime. After the addition was complete, the mixture was heated to 80° to 85° C. and the NCO content was determined (theoretical value 2.0%). The chain extender solution, comprising 60.9 g (0.1542 mole) of a 40% aqueous solution of the sodium salt of β-aminoethyl-β-aminopropionic acid and 100 ml of demineralized water, was added at the same temperature and stirred for a further 15 minutes without heating. The mixture was then dispersed in 2000 ml of demineralized water over about 5 minutes and stirred for a further 4 hours without heating. A finely-divided dispersion having the following properties was obtained: solids content 30%; ionic content 15.2 meq $COO^-$/100 g; and ethylene oxide content 2.2%. The pH was 6.5.

Crosslinking Agent 2

367 g (1.782 NCO equivalents) of the biuret of hexamethylene diisocyanate (DESMODUR® N-100, Bayer AG) and 15.0 g (0.007 mole) of an n-butanol-started monofunctional ethylene oxide/propylene oxide polyether having a molecular weight of 2150 and an ethylene oxide content of 80% were mixed together. The mixture was heated to 95° to 100° C. and allowed to react with 190 g (1.68 mole) of caprolactam so that the temperature was maintained at 95° to 100° C. After the addition was complete, the mixture was stirred for one hour at 100° C. and the NCO content was determined (theoretical value 2.1%). The chain extender solution comprising 43.5 g (0.230 equivalents) of a 40% aqueous solution of the sodium salt of β-aminoethyl-β-aminopropionic acid and 90 ml of demineralized water, was added at the same temperature and stirred for a further 15 minutes without heating. The mixture was then dispersed in 1300 ml demineralized water over about 10 minutes and stirred for a further 4 hours without heating. A finely-divided dispersion having following properties was obtained: solids content 30%; ionic content 18.7 meq $COO^-/100$ g; and ethylene oxide content 2.0%. The pH was 8.

Crosslinking Agent 3

202.7 g (1.038 NCO equivalents) of the trimer of hexamethylene diisocyanate (DESMODUR® N-3300, Bayer AG) and 19.5 g (0.0087 mole) of an n-butanol-started monofunctional ethylene oxide/propylene oxide polyether having a molecular weight of 2150 and an ethylene oxide content of 80% were mixed together. The mixture was heated to 95° to 100° C. and stirred for 30 minutes at this temperature. After cooling to 60° C., the mixture was reacted at 60° to 70° C. with butanone oxime (0.8943 mole). After the addition was complete, the mixture was heated to 80° to 85° C. and the NCO content was determined (theoretical value 1.7%). The chain extender solution, comprising 11.2 g (0.029 mole) of a 40% aqueous solution of the sodium salt of β-aminoethyl-β-aminopropionic acid and 2.4 g (0.014 mole) of isophoronediamine in 30 ml of demineralized water, was added at the same temperature and stirred for a further 15 minutes without heating. The mixture was then dispersed in 702 ml of demineralized water over about 5 minutes and stirred for a further 4 hours without heating. A finely-divided dispersion having the following properties was obtained: solids content 30%; ionic content 9.2 meq $COO^-/100$ g; and ethylene oxide content 5.2%. The pH was 6.5.

Crosslinking Agent 4

177.4 g (0.9184 NCO equivalents) of the biuret of hexamethylene diisocyanate (DESMODUR® N-3200, Bayer AG), 22.9 g (0.0103 mole) of an n-butanol-started monofunctional ethylene oxide/propylene oxide polyether having a molecular weight of 2150 and an ethylene oxide content of 80%, 5.9 g (0.0655 mole) of 1,4-butylene glycol, and 16.9 g (0.0278 mole) of a reaction product of one mole butene-2-diol-1.4, four moles propylene glycol, and one mole sodium bisulfite were mixed together. The mixture was heated to 100° C., stirred for 120 minutes at this temperature, and the NCO content was determined (theoretical value 13.6%). After cooling to 70° C., the mixture was reacted with 66.1 g (0.7598 mole) of butanone oxime at 70° to 80° C. and stirred for a further 10 minutes. Examination by IR showed that NCO was no longer present. The mixture was then dispersed in 663 ml demineralized water and stirred for a further 4 hours without heating. A finely-divided dispersion having the following properties was obtained: solids content 30%; ionic content 9.8 meq $SO_3^-/100$ g; and ethylene oxide content 6.8%. The pH was 6.5.

The following components were also used as described below:

Acrylate fixing agent: a 40% aqueous dispersion of an acrylonitrile/butyl acrylate/styrene/acrylic acid emulsion copolymer (4:83:8:3 parts)

Polyurethane fixing agent: a 40% aqueous dispersion of a polyurethane based on hexamethylene diisocyanate (ACRAMIN® PUD, Bayer AG)

Thickener solution: a 4% aqueous solution of a cellulose derivative (NATROSOL® MR, Hercules Powder)

Emulsifier L: a 42% aqueous solution of an emulsifier (EMULGATOR® L, Bayer AG)

Emulsifier VA: a 46% aqueous solution of an emulsifier (EMULGATOR® VA, Bayer AG)

Emulsifier WN: a 90% aqueous solution of an ethylene oxide polyether, started on a phenolic component, having an average molecular weight of about 900 (EMULGATOR® WN, Bayer AG)

Acrylic acid/acrylamide copolymer dispersion: a 29% aqueous dispersion of the ammonium salt of a weakly crosslinked acrylic acid/acrylamide copolymer in an isoparaffin hydrocarbon (ACRAKONZ® BN, Bayer AG)

ACRAMIN® Blau FBC: an aqueous pigment formulation based on copper phthalocyanine (Bayer AG)

SOLVESSO® 100: an aromatic hydrocarbon mixture (boiling point 163°–181 ° C.) (Esso Chemie, Cologne)

Melamine/formaldehyde condensate: ACRAFIX® MF (Bayer AG)

Example 1

The following were added in succession to a printing paste consisting of an oil-in-water emulsion that is customarily used in practice:

6.0 to 20.00% a commercially available acrylate fixing agent with crosslinkable groups 0.25% an acid dispenser (e.g., a 1:2 solution of diammonium phosphate in water)

0.1 to 1.00% a (silicone- or fatty acid-based) plasticizer 0.3 to 2.00% the crosslinking agents described above and, depending on the depth of color, up to 5.00% a copper phthalocyanine pigment paste (C.I. Pigment Blue 15)

The printing pastes obtained in this manner were printed onto cotton or blended fabrics by the rotary, flatbed, or roller printing process. After drying at 80° to 130° C., the prints were subsequently fixed at 120° to 150° C. for 10 to 4 minutes, preferably using hot air.

Colored pigment prints thus obtained exhibited good color fastness values in use that were equal to the color fastness values of a print obtained using a melamine-formaldehyde condensate.

A portion of each printing paste was stored for 4 weeks at 23° C. and the printing was repeated. The results were absolutely identical, leading to the inference that storage stability was greater than 4 weeks.

Example 2

Instead of a commercially available acrylate fixing agent, 6 to 20% of a butadiene fixing agent were used. Colored pigment prints thus obtained had a particularly soft feel and very good properties in use. The prints were particularly durable when subjected to chemical cleaning.

Example 3

Instead of the acrylate fixing agent, 6 to 20% of a polyurethane fixing agent were used. Colored pigment prints having elastic spring-back properties and good color fastness values in use were obtained.

Example 4

Instead of the oil-in-water emulsion, about 2 to 4% of a high molecular weight synthetic copolymer of acrylic acid and acrylamide or of an ethylenemaleic acid copolymer was used (in each case, as the ammonium salt). A 35% dispersion of a red pigment (C.I. Pigment Red 146) was used as the colored pigment.

A viscose staple fiber fabric was printed, subsequently dried, and then fixed by means of hot air at 120° to 150° C. for 4 minutes. Prints with very good color fastness values in use were obtained (dry- and wet-rubbed color fastness values in a domestic wash at 60° and 95° C.).

Example 5

The batch corresponded to that of Example 4. However, instead of the red pigment, 10 to 50% of a titanium oxide preparation were added. A 40 to 50% polyurethane dispersion was preferably used as the fixing agent.

With the addition of crosslinking agent 1, highly elastic prints were obtained after printing on knitted fabrics of cotton, viscose rayon fiber, or blends containing synthetic materials. These resulted in durable white prints after fixing at 120° to 150° C. for 4 to 10 minutes.

Example 6

The crosslinking agents listed in the following Table were used with the printing paste from Example 4.

| Printing pastes as in Example 4 | 99.7 to 98% |
| --- | --- |
| Crosslinking agent 2 | 0.3 to 2% |
| Crosslinking agent 3 | 0.3 to 2% |
| Crosslinking agent 4 | 0.3 to 2% |

The printing pastes were printed onto cotton fabric that had been mercerized and bleached or mercerized only. Prints with good light-fastness properties were obtained after drying and fixing with hot air at 120° to 180° C. for 1 to 10 minutes.

Crosslinking agents 2, 3, and 4 provided the same level of color fastness as crosslinking agent 1.

Example 7

The following constituents were stirred into 50 parts of a commercially available 3% high-molecular-weight hydroxyethyl cellulose:

| 3.0 parts | a 40% dispersion of a copper phthalocyanine green, C.I. Pigment Green 7 |
| --- | --- |
| 0.1 to 0.5 parts | a silicone dispersion |
| 1.0 to 3.0 parts | crosslinking agent 1 |
| about 45 parts | water |

The finished printing paste was screen-printed on to linen, dried, and then fixed with hot air. Prints with good color fastness properties were obtained.

Example 8

5 to 20 parts of crosslinking agent 1 and 1 to 20 parts of a 38% aqueous preparation of a phthalocyanine blue were added to a dye bath consisting of the following:

| 40 to 100 parts | a copolymer of butyl acrylate, styrene, acrylonitrile, and N-methoxymethyl methacrylate |
| --- | --- |
| 1 to 5 parts | an acid dispenser |
| 1 to 3 parts | an organic acid |
| 5 to 10 parts | an anti-migration and wetting agent |

A cotton fabric was pad-dyed with this dye bath, dried at 80° to 100° C., and then fixed at 140° to 150° C. using hot air for 3 to 5 minutes. A dyeing effect was obtained that exhibited improved color fastness levels when subjected to washing and rubbing compared with customary pigment dyeing.

Comparison Test

Example 1 from German Offenlegungsschrift 3,109,978 was reproduced exactly.

a) Reaction of dimeric oleic acid with propylene oxide and hexamethylene diisocyanate:

565 parts of dimeric oleic acid are reacted with 896 parts of propylene oxide in an autoclave at 130° to 140° C. using 4 parts of KOH as the catalyst.

Then the mixture is acidified with 12 parts of benzoyl chloride and added dropwise at 60° to 80° C. to 336 parts of hexamethylene diisocyanate, to which 0.15 parts of tin octoate had been added, and the mixture was subsequently stirred for 1 hour at 80° C.

A yellow product (crosslinker) is obtained with an isocyanate content of 1.1 mVal/g and a viscosity of 40° C. of 2,840 mPa·s.

b) Preparation of the printing paste:

The following are added successively to 115 parts of a 6% aqueous solution of the ammonium salt of polyacrylic acid:

600 parts of water, 40 parts of a 25% aqueous urea solution, 40 parts of a tallow fatty alcohol reacted with 25 mols of ethylene oxide, 120 parts of a 45% aqueous dispersion of a terpolymer of 70% butadiene, 26% styrene, 3% N-methylol acrylamide and 1% acrylamide, and 25 parts of the crosslinker prepared according to (a).

Portions of the obtained composition were blended with the pigment pastes used in Examples 1, 4, 5 and 7.

Prints with the crosslinking agent according to German Offenlegungsschrift 3,109,978 exhibited color fastness levels which were only slightly improved compared with prints without external crosslinking agents.

When the printing pastes were stored for one week and printing was repeated thereafter, color fastness was no longer obtained. The color fastness level was then identical to that of a comparison without a crosslinking agent.

What is claimed is:

1. A method for textile printing with an organic fixing agent comprising applying to a textile substrate an aqueous dispersion comprising (1) an organic fixing agent comprising a polymer having isocyanate-reactive groups;

(2) 1 to 25 parts by weight per 100 parts of the organic fixing agent of a crosslinking agent consisting essentially of a blocked polyisocyanate having (i) an average molecular weight of 800 to 25,000, (ii) a content of blocked isocyanate groups, calculated as free NCO and based on non-blocked polyisocyanate, corresponding to an NCO content of 5 to 20% by weight, (iii) an ionic group content of 1 to 75 milliequivalents per 100 g of blocked polyisocyanate, and (iv) a content of polyalkylene oxide units of 1 to 20% by weight, based on blocked polyisocyanate, said blocked polyisocyanate being obtained by the reaction of (a) an organic polyisocyanate,
(b) an isocyanate-reactive compound containing ionic groups or potential ionic groups,
(c) a polyalkylene ether alcohol,
(d) an NCO blocking agent, and
(e) optionally, an isocyanate-reactive compound different from components (b), (c), and (d);

(3) a pigment;
(4) optionally, an auxiliary processing agent; and
(5) water.

2. A method according to claim 1 wherein the blocked polyisocyanate has an average molecular weight of 1000 to 10,000.

3. A method according to claim 1 wherein the blocked polyisocyanate has a content of blocked isocyanate groups of 10 to 20% by weight, calculated as free NCO and based on non-blocked polyisocyanate.

4. A method according to claim 1 wherein the blocked polyisocyanate has a content of ionic groups of 2 to 25 meq per 100 g of blocked polyisocyanate.

5. A method according to claim 1 wherein the blocked polyisocyanate contains 1 to 10% by weight of polyethylene oxide units.

6. A method according to claim 1 wherein 0.5 to 50% by weight of pigment, based on the total amount of components (1), (2), and (3) is used.

7. A method according to claim 1 wherein the aqueous dispersion contains 20 to 80% by weight of the blocked polyisocyanate.

8. A method according to claim 1 wherein the organic fixing agent is an isocyanate-reactive-group-containing natural or synthetic rubber, a styrene/butadiene copolymer, a polymer of 2-chlorobutadiene, a styrene/acrylonitrile copolymer, polyethylene, a chlorosulfonated polyethylene, a chlorinated polyethylene, a butadiene/acrylonitrile copolymer, a butadiene/methacrylate copolymer, a polyacrylic acid ester, a PVC, an ethylene/vinyl acetate copolymer, or a polyurethane.

9. A method according to claim 1 wherein the NCO blocking agent is a compound having one isocyanate-reactive group selected from the group consisting of secondary alcohols, tertiary alcohols, acidic C—H compounds, oximes, lactams, phenols, N-alkylamides, imides, imidazole, and triazole.

* * * * *